United States Patent [19]

Benckhuijsen

[11] Patent Number: 4,671,049

[45] Date of Patent: Jun. 9, 1987

[54] PROTECTIVE BLANKET FOR HOOFED AND DOMESTIC ANIMALS, IN PARTICULAR HORSES AND DOGS

[75] Inventor: Jan-Gerrit Benckhuijsen, Schaan, Liechtenstein

[73] Assignee: Temova Etablisement, Schaan, Liechtenstein

[21] Appl. No.: 911,097

[22] Filed: Sep. 24, 1986

Related U.S. Application Data

[63] Continuation of Ser. No. 691,734, Jan. 16, 1985, abandoned, which is a continuation of Ser. No. 574,955, Jan. 31, 1984, abandoned, which is a continuation of Ser. No. 354,526, Mar. 3, 1982, abandoned.

[30] Foreign Application Priority Data

Mar. 12, 1981 [CH] Switzerland ............ 1688/81

[51] Int. Cl.$^4$ ................................. B68C 5/00
[52] U.S. Cl. ........................... 54/79; 128/379; 66/196; 5/502
[58] Field of Search .......... 54/79; 128/165, 82.1, 128/379, 402; 5/484, 500, 502

[56] References Cited

U.S. PATENT DOCUMENTS 2,921,457  1/1960  Evans .................. 66/196 X
3,467,974  9/1969  Deutsch ................ 5/502
3,584,436  6/1971  Gulyas ................. 54/79
4,336,807  6/1982  Benckhuijsen .......... 128/379

*Primary Examiner*—Robert P. Swiatek
*Attorney, Agent, or Firm*—Cushman, Darby & Cushman

[57] ABSTRACT

Figure 5:
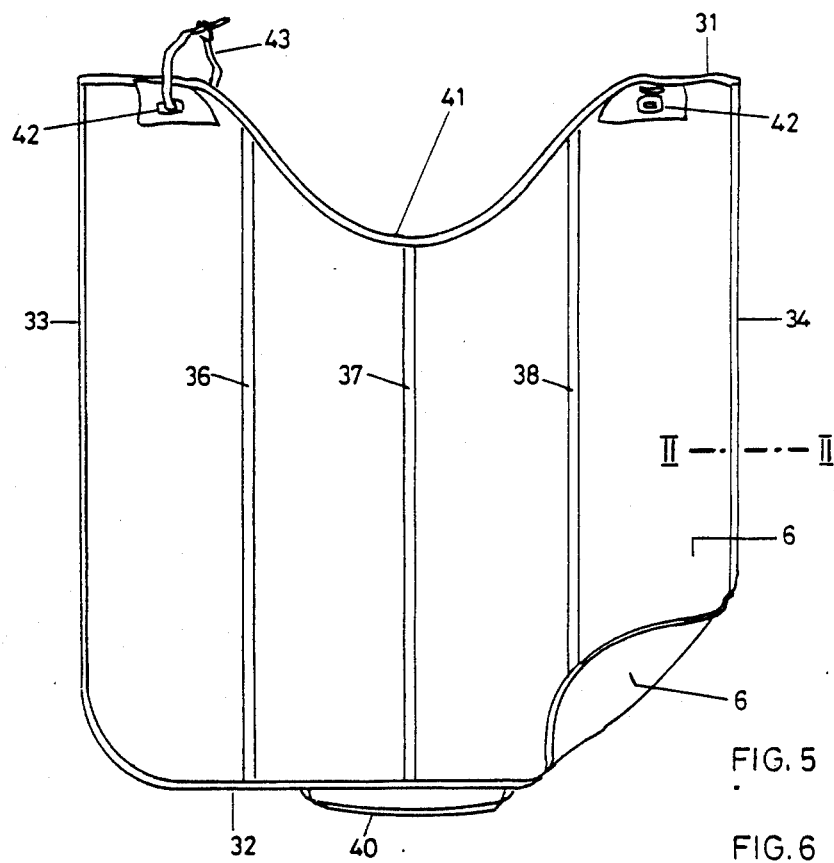

Protective blanket for hoofed and domestic animals, in particular horses and dogs, to protect against the influences of cold in cold weather or due to evaporation of the skin moisture after physical exertion, and for thermal treatment of certain ailments, e.g. influenza or kidney trouble. Woolen or linen blankets have the disadvantage of not giving off the evaporation moisture and do not provide warmth when wet. The protective blanket according to this invention provides better heat protection and has a therapeutic effect due to the fact that it consists of two mutually movable layers of a knit fabric (6) made of nonhygroscopic synthetic fibers fit for generating static electricity and with a mesh of 50–125/cm$^2$. For choice, the blanket contains a synthetic foam lining permeable to air between the two layers of fabric (6). The drawing shows the outside of a horse blanket with a neck rim (31) at the head end and a rear rim (32) with a loop (40) to accommodate the tail. The cutout (41) at the neck rim produces two blanket ends to fit around the breast (FIG. 5).

4 Claims, 9 Drawing Figures

PROTECTIVE BLANKET FOR HOOFED AND DOMESTIC ANIMALS, IN PARTICULAR HORSES AND DOGS

This is a continuation application of Ser. No. 691,734, filed on Jan. 16, 1985, now abandoned; which was a continuation of application Ser. No. 574,955, now abandoned, filed on Jan. 31, 1984; which was a continuation of Ser. No. 354,526, filed on Mar. 3, 1982, and now abandoned.

This invention refers to a protective blanket for hoofed and domestic animals, in particular horses and dogs, which lies on the area between neck and tail.

Hoofed animals, in particular horses, are often exposed to undesirable cold outside, either due to cool weather or after physical exertion due to the cold of evaporation on the skin. Racing horses have to be rubbed dry after training and races since a conventional woollen blanket will preserve the sweat moisture. With certain horse diseases, e.g. influenza or kidney trouble, a heat treatment in the area of the diseased organs is desirable. But the well-known woollen and linen blankets are unfit for this purpose since they do not carry off the evaporation humidity, as a rule, and do not provide heat in their moist condition. The same inconveniences of insufficient protection against cold are true of the regular dog coats and blankets on the market. Such blankets prove particularly useless for breeds which are particularly sensitive to weather influences due to their hairless or shorthaired coats.

The present invention has the purpose of creating a protective blanket to provide better thermal protection against cold caused by the weather or evaporation. A further purpose consists in providing a therapeutically effective remedy by this blanket at the same time.

These objectives are met by a protective blanket of the above-named type, characterized by its nature, namely its therapeutic effectiveness against colds, as well as its heat-generating properties in case of cold due to weather influences or cooling off by evaporation of the skin moisture, consisting of two — mutually movable — layers of a knit fabric made of nonhydroscopic synthetic fibers suitable for generating static electricity and which has 50 to 125 stitches/cm$^2$ and layer.

Figure 2:
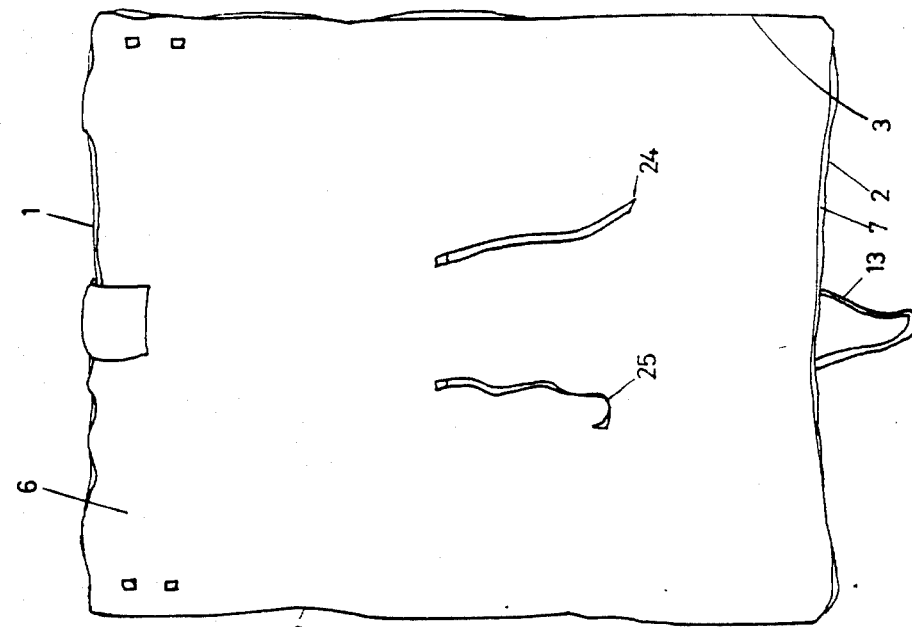
Figure 1:
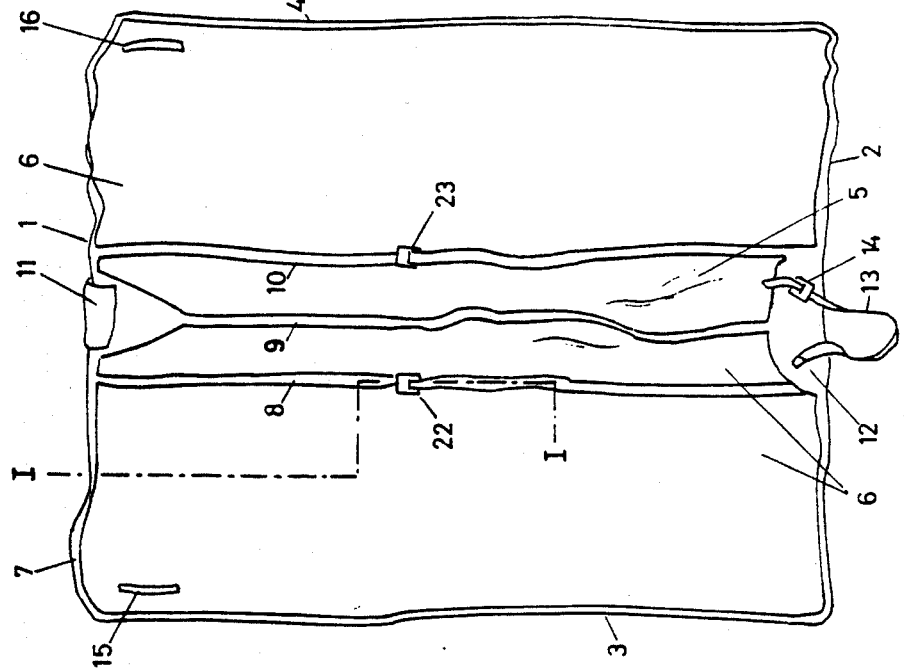
Figure 3:
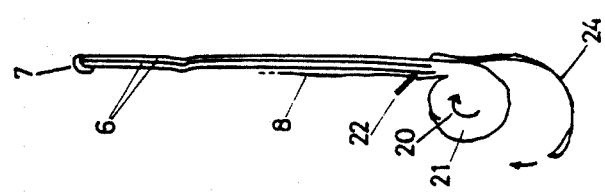
Figure 4:
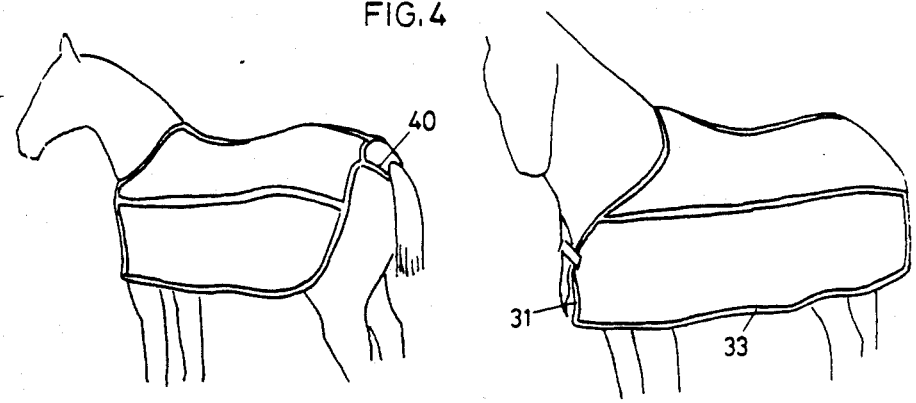
Figure 6:
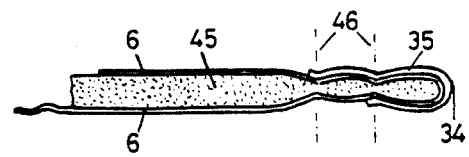
Figure 7:
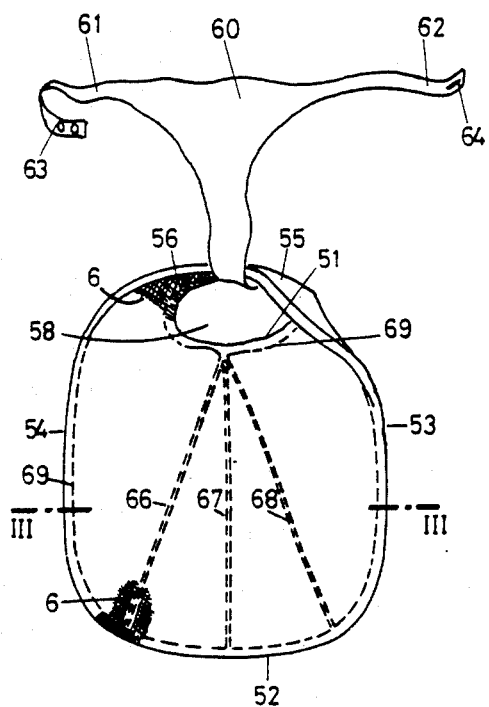
Figure 8:
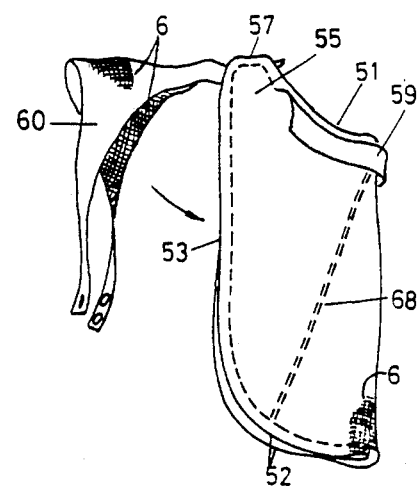
Figure 9:
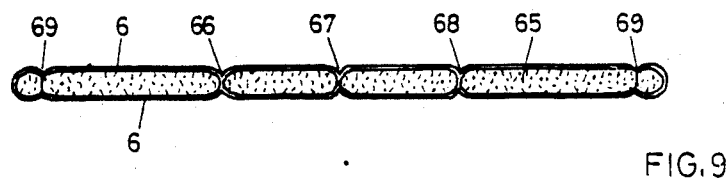

The present invention will be explained in detail for some examples of application hereinafter, based on the attached drawings. They show:

FIG. 1 in simplified, schematic representation: a top view of the outside of a protective blanket fashioned like a saddlecloth;

FIG. 2 in simplified, schematic representation: a top view of the underside of the blanket shown in FIG. 1 which comes in contact with the skin;

FIG. 3 in simplified, schematic representation: a section along the line I—I of FIG. 1 of a partially rolled-up blanket;

FIG. 4 comprises two drawings of a further type of protective blanket for horses;

FIG. 5 in simplified, schematic representation: a top view of the outside of the blanket of FIG. 4;

FIG. 6 a partial section through the protective blanket of FIG. 5 along the line II—II of FIG. 5;

FIG. 7 a simplified representation of a perspective view of the spread underside of a protective blanket for dogs;

FIG. 8 a view of the outside of the dog blanket of FIG. 7 when folded;

FIG. 9 a section along the line III—III of the dog blanket of FIG. 7 in a simplified representation.

The design example according to FIGS. 1 to 3 shows a protective blanket for horses fashioned as a saddlecloth and to be put under a saddle. The almost rectangular blanket is bordered by the neck rim 1 towards the head, the rear rim 2 towards the tail, and the side rims 3,4 towards the belly. The blanket format is preferably designed to cover the entire back area between the tail root and the center neck and to fall off to the sides to the level of the lower belly curve. For grown-up animals, a size of 110×135 cm ±10% has proved to be suitable. The blanket may be anatomically adapted to the animal's body for contact without folds, as for instance indicated by the bulging 5 in FIG. 1 which hugs the rounded rump.

Basically, the blanket consists of two layers of a knit fabric 6 of a quality described further on. The fabric layers are sewed together with a protective border 7 along the rims 1-4 which binds the rims and which consists of a flexible synthetic material or imitation leather. The reinforcing strips 8-10 and the caps 11,12 applied to the outside and hemmed to the underside are made of the same material (see FIG. 1). If the blanket is made of three webs of fabric, the strips 8,10 run along the joining seams. A belt 13 is attached to the protective cap 12 on the rear rim 2, and its loose end runs through a sewn-on buckle 14. Belt 13 is an adjustable loop to pass the horse's tail and fasten the blanket around the tail root. In the corners of the neck rim 1 with the side rims 3,4, there is a loop 15,16, through which one of the girths is passed to fasten the blanket to the horse.

Although the horse is fully ridable with the completely spread blanket, it is convenient if the rump can be easily covered or uncovered before or after the ride. To such a purpose, the present blanket, as shown in FIG. 3, may be rolled-up to a certain extent on the horse, from the rear towards the front in the direction of the arrow 20, and the resulting roll tied in place. To tie the roll, there are the buckles 22,23 sewn onto the straps 8,10, as well as the belts 24,25 attached to the underside of the buckles. The belts 24,25 are oriented backward and can be made fast around the roll 21 and into the buckles 22,23.

As mentioned initially, the purpose of the invention of the present blanket consists—besides its use as a saddlecloth—essentially in its protective effect against cold due to the weather or to evaporation. This protective function as well as the therapeutic effect of the blanket results from the nature of the double-layered fabric 6. From human medicine a number of synthetic fiber fabrics are known which are suitable to produce an electrostatic charge against the skin and thereby a feeling of warmth which is why such fabrics are used to make health underwear. If the knit fabric 6 described for the above protective blanket is made of such a textile fiber, the blanket is also appropriate as a therapeutic means to treat kidney trouble, since it is in close contact with the corresponding area of the body and produces considerable electrostatic warmth. In this context it is an advantage that the animal does not have to remain in the stable since physical exercise fosters the generation of static electricity and thereby the generation of heat. A further relevant point is the fact that the knit fabric 6 of the quality described hereinafter is non-hygroscopic and has a mesh opening which guarantees the perfect evaporation of skin moisture. Due to these facts, the blanket prevents cold of evaporation when put on a perspiring body, since the static electricity generates heat as soon as the moisture is evaporated.

The said knit fabric 6 is a synthetic fiber knit for which purpose the paraffined polyvinyl chloride fibers of the THERMOVYL brand have proved suitable; if increased wear resistance is desired, a 10-15% share of acrylic fibers may be added to the polyvinyl chloride fibers. But any other synthetic fiber suitable for generating static electricity may be used to manufacture the knit fabric 6, too. To maintain the highest possible value for the charge on the skin and the electrostatic tension, the knit fabric ought to be as dense as possible on the one hand, to produce high electrostatic readings, and on the other hand have sufficiently large mesh openings to allow easy evaporation of the skin moisture. These requirements can best be met by fine-ribbed or interlock knits of the following specifications:

The fine-ribbed knit is made with a number of 25 stitches/2 cm of length and 15 stitches/2 cm of width, a number of openings of $80/cm^2$ and a weight of $160/m^2$. In general, the most effective ranges of stitches were established at 18-25 stitches per 2 cm in length and 12-20 stitches per 2 cm in width and 120-180 $g/m^2$ as the preferred range of weight for the fine-ribbed knit. With an interlock knit produced with 16 needles per 2 cm, the most effective specifications for the purposes of application are: Weight of yarn 40000-50000 m long/kg, number of stitches 20-30 stitches/2 cm in length and width, basis weight 150-300 $g/m^2$. Typical data are, for instance for a 40000 m/kg yarn: 26 (25) stitches per 2 cm of length (width) and 260 $g/m^2$ of weight; for a 50000/kg yarn: 25 (24) stitches per 2 cm of length (width) and 200 $g/m^2$ of weight. Thus, a double-layered blanket has a weight of about 250-400 $g/m^2$.

As indicated above and apparent from FIG. 3, the protective blanket is made up of two layers of the above knit fabric 6. Since these layers are mutually movable by areas, the electrostatic tensions against the skin are further increased and may exceed 30 KV.

The protective blanket does not have to be fashioned like a saddle cloth, according to the example of design, but merely be fashioned like a throw-over blanket. For other hoofed animals, such as ponies, the above-named dimensions are reduced by 25%.

A preferred design as a horse blanket is shown in FIG. 4-6. This protective blanket with measurements of 180×170 cm differs from the blanket according to FIG. 1-3 by its different cut and in particular by a lining between the two layers of knit fabric 6. Referring to FIG. 5 and analogously to the first design example, this blanket also has rims 31-34 bordered by a protective edge 35 made of a synthetic fabric of leather, reinforcing straps 36-38 of the same material on the outside, as well as a loop 40 at the rear rim 32 to attach the blanket around the root of the tail. But unlike the blanket according to FIG. 1-3, this type of a horse blanket now has a cutout 41 at the neckline 31 for fitting and fastening around either side of the lower neck and breast, as shown in FIG. 4. For fastening purposes there are the loops 42 placed on either side of the cutout 41 for passage of a belt 43 therethrough. Although the present blanket is comparatively low cut around the neck, such a cut of the blanket basically also permits it to cover the center and higher neck areas and therefore this type of protective blanket is well suited for the treatment of colds.

The underside in contact with the animal consists of the same textile fabric 6 throughout, as described above for the first example. Consequently, we may abstain from repeating the same details, and the protective blanket of FIGS. 4-6 has the same protective properties against the influence of cold due to the weather or to evaporation as mentioned above, and due to its generation of electrostatic charges against the skin it has a therapeutic effect. Now this protection against cold and the therapeutic effect of the present blanket are further increased by the lining 45 inserted into the blanket. As shown in the partial section of FIG. 6, the lining stretches from rim to rim 31-34, that is, it runs through the whole blanket. The lining 45 has to be sufficiently supple to contribute to the contact pressure of the fabric 6 against the skin, to increase its effectiveness. The lining 45 also has to be sufficiently permeable to air. For in combination with a fabric 6 of the above nature and properties, such permeability to air is indispensable for the lining 45 to let the skin moisture evaporate easily through the blanket. Experience has shown that a polyvinyl chloride (PVC) foam of the TROVIPOR brand or a polyurethane foam are suitable as linings 45 since their open pores let the air pass. The preferred thickness for such a lining 45 of the said foam is 5-10 mm.

Obviously, the blanket also has to be permeable to air on the outside. As proven in practice, the therapeutic effectiveness of the blanket is increased if instead of any kind of permeable material, such as linen, the fabric 6 of the above quality is also used for the outer layer of the blanket. It is further convenient to have two mutually movable layers of fabric 6 surround the lining 45 on all sides.

As indicated in FIG. 6, the border protection 35 made of synthetic fabric or imitation leather and folded over the side rim 34, is attached by through-seams in the direction of 46 which at the same time bond the fabric layers 6 of the outside and the underside with the lining 45. The outside reinforcing strips 36-38 and possibly any other strips and fastenings attached to the outside, are sewn to the underside fabric 6 by similar seams 46. The seams 46 are either conventional sewn seams or welded seams since all materials to be bonded may also be processed by a high-frequency welding process known from the leather industry.

The protective blanket of a nature such as this invention is also suitable for other four-legged domestic animals other than horses, e.g. dogs. FIGS. 7-9 show an example of a type of protective blanket fashioned as a dog blanket. Analogously to the two horse blankets above, the dog blanket also has both the inside and the outside made of the knit fabric 6 mentioned above and indicated by cross hatching in this drawing. Thus, the same heating properties and therapeutic effects described or the protective blanket according to FIGS. 1-3 also apply to the dog blanket; we therefore refer to said parts of the text to avoid repetition.

According to FIGS. 7,8 the dog blanket has a front neck rim 51, a rear back rim 52 and side rims 53,54. The neck rim 51 is cut out almost in a half circle and has two lateral extensions 55,56 with their ends joined along the edge 57. This provides the opening 58 for the neck encircled by the neck rim 51; when the head passed through the neck opening, the blanket is attached to the neck. The two joined ends 55,56 produce a collar covering the underside of the neck. On the outside, a collar 59 runs along the upper neck rim 51. This collar can be turned up towards the head. The triangular plastron 60 is a part of the blanket and provides a ventral cover as a continuation of the dorsal cover of the animal. The plastron 60 issues from the neck opening 58 at the joining seam 57 and its two loose tips are fashioned as fastening tapes 61,62 and equipped with buttons 63 on one side and a buttonhole 64 on the other. It is evident that the plastron 60 covers the underside of the neck, the breast and the belly, and the tapes 61,62 can be passed around the blanket or over the back of the animal. According to this invention, the plastron 60 as a component of the dog blanket also consists of two layers of the above fabric 6 throughout, as indicated in FIG. 8.

As per FIG. 9, the dog blanket fashioned as indicated above can also contain a lining 65 in its dorsal part while the ventral part is without a lining. Since the same requirements have to be met by the lining 65 as those of the lining 45 of the horse blanket according to FIG. 4-6, a PVC or polyurethane foam padding which is permeable to air proves to be a particularly suitable lining for the dog blanket, too. To provide a good fit to the curvature of the back, the lining has been cut fan-like towards the rear rim 52. The seams 66-68 along the cut lines join the fabric layers of the top and the underside. The rims 51-54 and the edge of the plastron 60 are similarly bordered by such seams 69; all seams can be sewn or welded, depending on the method of manufacture.

The present model of a dog blanket is fit for summer and winter wear and can be adapted in size to all current breeds. Typical lengths of the back seam 67—the center folding line of the blanket—range from 20 . . . 50 cm. The present invention also covers dog blankets without the lining 65 and/or the plastron 60.

I claim:

1. A flexible protective therapeutic blanket for hoofed and domestic animals, in particular horses and dogs, for application to the animal's back in the area between neck and tail, consisting of an inner and an outer layer of fabric and a substantially coextensive intermediate layer of an air-permeable non-hygroscopic insulating layer, said inner and outer layers also being air permeable to allow evaporating moisture to pass through said blanket, the inner and outer layers being mutually movable and movable relative to the skin of the animal and thus capable of developing relatively large eletrostatic charges on the skin of the animal by reason of frictional engagement between the layers and between the blanket and the skin, said inner and outer fabric layers consisting of at least 85% polyvinyl chloride fibers; and said fabric being knitted with between 18 and 25 stitches per 2 cm in length, and between 12 and 20 stitches per 2 cm in width.

2. A blanket as claimed in claim 1, in which the fabric has a weight of between 150 and 300 grams per square meter.

3. A blanket as claimed in claim 1, in which said insulating layer consists of synthetic foam.

4. A blanket as claimed in claim 3, in which said synthetic foam is selected from the group consisting of polyvinyl chloride foam and polyurethane foam and said foam layer has a thickness of between 5 and 10 millimeters.

* * * * *